United States Patent [19]

Van Nahmen

[11] Patent Number: 5,372,396
[45] Date of Patent: Dec. 13, 1994

[54] INVERTIBLE CARGO BED LINER

[76] Inventor: Alan G. Van Nahmen, 1220 Countryside La., Columbus, Ind. 47201

[21] Appl. No.: 114,504

[22] Filed: Aug. 31, 1993

[51] Int. Cl.$^5$ ............................................. B62D 33/02
[52] U.S. Cl. .................................... 296/39.2; 296/37.5
[58] Field of Search .................... 296/39.1, 39.2, 37.5; 105/423; 224/42.42

[56] References Cited

U.S. PATENT DOCUMENTS

| | | | |
|---|---|---|---|
| 1,419,085 | 6/1922 | Unser | 296/39.1 X |
| 2,898,146 | 8/1959 | Yudenfreund | 296/39.1 |
| 3,653,710 | 4/1972 | Barnard | 296/39.1 |
| 4,091,149 | 5/1978 | Oxendine | 428/33 |
| 4,186,845 | 2/1980 | Podd | 220/461 |
| 4,279,439 | 7/1981 | Cantieri | 296/39.2 |
| 4,750,776 | 6/1988 | Barben | 296/39.2 |
| 4,890,874 | 1/1990 | Davis | 296/39.2 |
| 4,893,862 | 1/1990 | Hollenbaugh, Sr. | 296/39.1 |
| 4,943,105 | 7/1990 | Kacar et al. | 296/39.1 X |
| 4,991,899 | 2/1991 | Scott | 296/39.2 |
| 5,007,670 | 4/1993 | Wise | 296/39.1 |
| 5,080,418 | 1/1992 | Semple et al. | 296/39.2 |
| 5,083,830 | 1/1992 | Mucher et al. | 96/39.2 |
| 5,110,171 | 5/1992 | Anthony | 296/39.2 |

FOREIGN PATENT DOCUMENTS

| | | | |
|---|---|---|---|
| 1011938 | 12/1965 | United Kingdom | 296/39.1 |
| 2118109 | 2/1982 | United Kingdom | 296/39.1 |

OTHER PUBLICATIONS

Commercial Car Journal, Jun. 1979, p. 220.

*Primary Examiner*—Dean J. Kramer
*Attorney, Agent, or Firm*—Ice Miller Donadio & Ryan

[57] ABSTRACT

An invertible cargo bed liner having a rigid horizontal support structure or panel and a pair of rigid protector panels pivotally connected thereto. A soft pad or the like is attached to the support structure and covers the support structure surface opposite the surface to which the protector panels connect. When tile invertible cargo bed liner is to be positioned in a storage orientation, tile protector panels are both pivoted inwardly toward the support structure and the liner is inserted into a vehicle cargo bed with the padded surface facing upright and the protector panels folded underneath tile support structure. The liner covers tile cargo bed floor and the pad provides a softer surface over which an operator can move. When materials are desired to be transported, the liner is first extracted from the cargo bed, inverted, and then reinserted. The protector panels are then unfolded or pivoted to a substantially vertical orientation where they rest against the upright side walls or surfaces of the vehicle cargo bed and thereby protect these surfaces from damage from contact with the materials loaded into the liner. The pad can also be attached to the support structure such that tile pad covers at least a portion of the various edges of tile structure to provide a cushion between the liner sides and the cargo bed, thereby preventing incidental damage to the cargo bed.

12 Claims, 8 Drawing Sheets

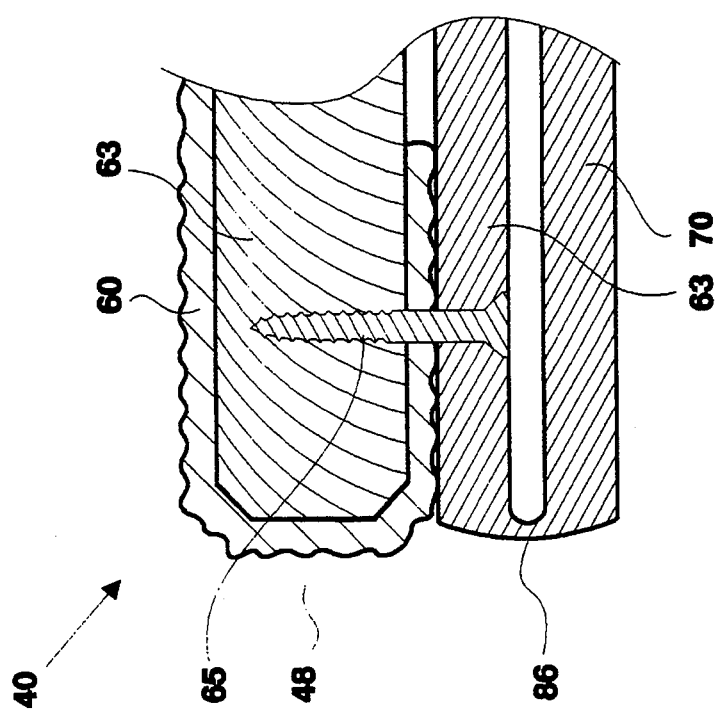

INVERTIBLE CARGO BED LINER

FIELD OF THE INVENTION

This invention relates to vehicle bed liners, and, in particular, to a liner which can be inverted to substantially transform the liner from a storage orientation to a materials transport orientation.

BACKGROUND OF THE INVENTION

Pickup trucks are extremely popular amongst consumers because of their versatility of use. In addition to satisfying basic transportation needs, pickup trucks also provide ample cargo space for transporting almost any type of materials. Some pickup truck owners, irrespective of whether or not they employ form-fitting liners to overlay and protect the cargo bed interiors, leave their truck cargo beds exposed. As a result, tools or materials placed and carried within the cargo bed are thereby accessible to a person by reaching over the vehicle sides, or by reaching in from the rear by the tailgate. On the other hand, many truck owners desire to store tools or materials in the cargo bed for extended periods of time or even permanently. To protect these stored materials from the damaging effects of the elements or from theft, a camper shell, or topper, can be mounted over the cargo bed to form an enclosed compartment.

While protective of the cargo bed contents, utilization of a camper shell to cover a cargo bed is not without its shortcomings for the user. For instance, greatly inconvenienced accessibility to the cargo bed contents is a significant deficiency of such configurations. The task of retrieving an item located in the forward regions of the cargo bed, or alternatively an item stored in a tool box or container situated along the side or forward walls of the cargo bed, becomes problematic as a person must normally enter the compartment from the tailgate entrance and crawl on her knees across the hard cargo bed floor. Persons who have performed this task can attest firsthand to the pain and discomfort it produces. To some extent, similar problems and discomfort can also occur in accessing cargo in vehicles such as vans, station wagons and other utility vehicles.

Another shortcoming pertains to the need to properly protect the interior of the cargo bed from damage caused by loading and movements of transported articles. Frequently, cargo beds equipped with camper shells do not also have overlaying form-fitting liners. This fact may result in part because an owner feels the camper shell reduces the need for a form-fitting liner as weather related damage to the cargo bed is ceased, or because the cost of providing this additional apparatus to protect the bed is extravagant in view of the infrequency of the transport of materials which are potentially damaging. Nevertheless, occasions do arise when a liner would be appropriate, and a conveniently located and operable temporary. liner would be beneficial for such owners.

Several vehicle inserts in the prior art have attempted to solve the problem of hard cargo bed floors. U.S. Pat. No. 4,091,149 discloses a specially designed pad for a vehicle having a flat bed. U.S. Pat. No. 5,007,670 similarly discloses an assembly for lining a vehicle bed with a pad. More rudimentary solutions involve merely placement of a rug or mat on the cargo bed floor. While such constructions allow a person to more easily move about the cargo bed without discomfort, they fail to account for a variety of situations likely to be encountered by a pickup truck user. For instance, on occasions when heavy abrasive or sharp edged materials are to be transported in the cargo bed, these inserts provide no protection to the sides of the vehicle cargo bed. In addition, it is not uncommon for persons owning pickup trucks to cart around soiled or dirty equipment, repair parts, batteries, dirt or other farm items. When such articles are transported, the cargo bed pads or mats also become soiled unless removed prior to usage. Upon being soiled, the usefulness of the pads are diminished as a person is much less likely to want to crawl across a pad, even if discomfort is lessened, as then the person may also become soiled. The best remedy for this shortcoming is entirely removing the pad prior to transporting the dirty cargo. However, because the pad portion must then be temporarily stored without the vehicle, after transport the person must backtrack and collect the pad. Moreover, because the dirty materials probably soiled the cargo bed floor, unless a person climbs into the cargo bed and cleans the floor prior to the replacement of the padded portions, these pads will also eventually become soiled.

Vehicles such as vans, station wagons, and other utility vehicles often have less need for pads or mats as the cargo bed floors may be carpeted. However, transporting dirty materials within these cargo beds can be problematic in view of the fact that these same carpets may become soiled. Temporary or removable cargo bed liners are disclosed in U.S. Pat. No. 5,110,171 as well as U.S. Pat. No. 4,893,862. While addressing the need for temporary protective liners for the cargo area, these devices do not necessarily readily blend in with the decor of the vehicle. Moreover, the devices do not provide a cushioned surface to facilitate an operator moving across them when the devices are not in the materials transport position.

An additional reference which describes a padded cargo bed floor is U.S. Pat. No. 4,186,845, which discloses a container liner which covers the floor of the container with a foam like material underneath a cover sheet. While side panels of the liner protect the sides of the cargo bed interior from materials transported therein, these non-rigid panels require securement to the side walls with, for example, staples. This type of securement would greatly damage a pickup truck or other vehicle interior. Furthermore, this liner, as well as many other prior liners, can not be partially removed from a vehicle and ramped to the ground to assist in the unloading and loading of materials.

OBJECTS OF THE INVENTION

Accordingly, one object of the present invention is to provide an invertible cargo bed liner which converts from a storage orientation to a materials transport orientation by inverting and unfolding the liner.

Another object of the present invention is to provide an invertible cargo bed liner which, after being transformed from a relatively flat storage orientation to a materials transport orientation, protectively covers the cargo bed floor and sides.

Another object of the present invention is to provide an invertible cargo bed liner which provides a padded covering of the cargo bed floor when the liner is disposed in a storage orientation, thereby allowing a person to travel across the cargo bed floor without discomfort.

Another object of the present invention is to provide an invertible cargo bed liner with a floor covering member sufficiently rigid and strong to allow the liner to be used as a ramp, thereby facilitating loading and unloading of the vehicle.

A still further object of the present invention is to provide an invertible cargo bed liner having a cushion disposed around edges of the floor covering member, thereby reducing the likelihood of damage to the cargo bed interior resulting from rubbing and sliding collisions with the liner.

A still further object of the present invention is to provide an invertible cargo bed liner with an attractive or complementary appearance when positioned in a storage orientation so as not to detract from the decor of the vehicle in which the liner is located.

SUMMARY OF THE INVENTION

In one form thereof, the invertible cargo bed liner of the present invention is designed for use with a vehicle cargo bed having a floor and a pair of opposing upright side surfaces and the liner comprises a support structure, padding means, and protector panels pivotally connected to the support structure. The rigid horizontal support structure covers the vehicle cargo bed floor and includes a top surface, a bottom surface, opposing first and second side edges, a forward edge, a rearward edge, and a width as defined by a distance between the opposing side edges. The padding means attaches to the support structure and covers the top surface of the support structure. The first and second pivotable rigid protector panels each have a top inward surface and a bottom outward surface. Means exist for pivotally connecting the first protector panel to the support structure proximate the first side edge and the second protector panel to the support structure proximate the second side edge. The pivotally connecting means allows each of the protector panels to be oriented at a horizontal position for storage with the top inward surface facing the bottom surface of the support structure, and an upright position for materials transport with the bottom outward surface facing one of the vehicle bed upright side surfaces.

In another form thereof, the invertible cargo bed liner of the present invention is designed for use with a pickup truck cargo bed having a floor, a forward upright wall, a rearward upright wall, and opposing upright side walls each having inwardly extending wheel wells with inner side surfaces generally perpendicular to the floor. The liner includes a support structure, padding means, and protector panels pivotally connected to the support structure. The rigid horizontal support structure covers the cargo bed floor and has a top surface, a bottom surface, first and second opposing side edges, a forward edge, a rearward edge, a length substantially equal to the distance between tile forward upright wall and the rearward upright wall, and a width substantially equal to the distance between the inner side surfaces of the wheel wells. The padding means attaches to the support structure and covers the top surface and at least a portion of the opposing side edges of the support structure. The first and second pivotable rigid protector panels each have a top inward surface and a bottom outward surface and a length substantially equal to tile length of the support structure and a height no more than half tile width of the support structure. Means exist for pivotally connecting the first protector panel to the support structure proximate the first opposing side edge and the second protector panel to the support structure proximate the second opposing side edge, The pivotally connecting means allow each of the protector panels to be oriented at a horizontal position for storage with the top inward surface facing the bottom surface of the support structure, and an upright position for materials transport with the bottom outward surface facing one of the inner side surfaces of the inwardly extending wheel well.

BRIEF DESCRIPTION OF THE DRAWINGS

FIG. 8 shows an enlarged view similar to FIG. 5 with an alternate attachment between the protector panel and the liner support structure.

DETAILED DESCRIPTION

Figure 1:
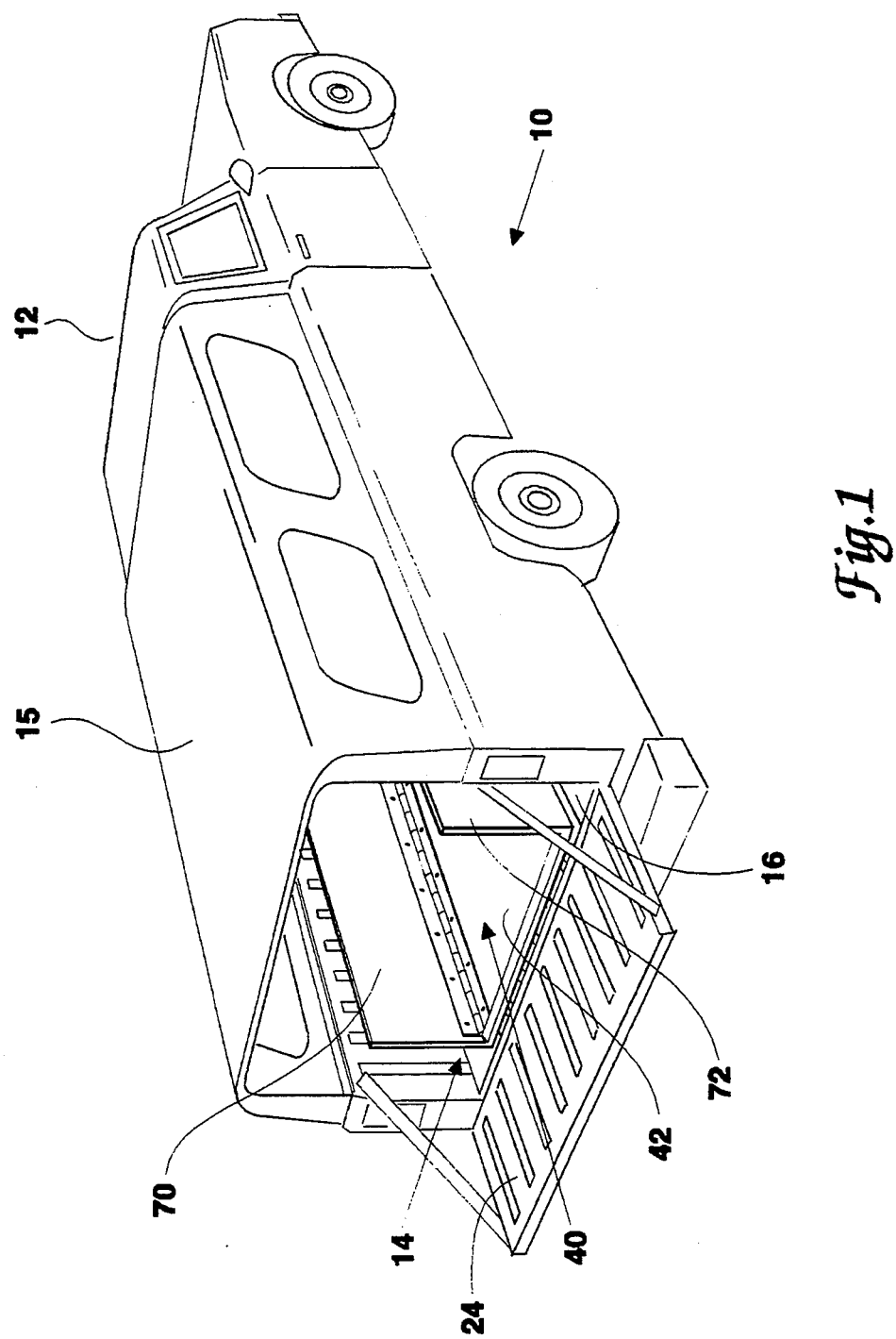
FIG. 1 shows a perspective view of a pickup truck having a liner of the present invention, positioned in a materials transport orientation, located therein.

Referring to the perspective view of FIG. 1, there is shown a standard pickup truck 10 which includes passenger cab 12 and cargo bed 14. Camper shell 15 is positioned above cargo bed 14 to form a covered cargo enclosure. As is well known in the art, and with additional reference to FIGS. 2 and 3, cargo bed 14 includes floor 16, opposing left and right upright side walls 18, 20, forward upright wall 22, and rearward upright wall or tailgate 24. Side walls 18, 20 respectively include inwardly extending wheel wells 26, 28 with inner side surfaces 27, 29 generally perpendicular to floor 16. While illustrated employed with pickup truck 10, the present invention is not limited to employment with this type of vehicle. Any vehicle having a cargo bed or area with a generally horizontal floor and upright side surfaces, for example a van or station wagon, can benefit from the teachings of the invention. Of course, a pickup truck cargo bed is particularly well suited for and benefits from use of the present invention.

Figure 2:
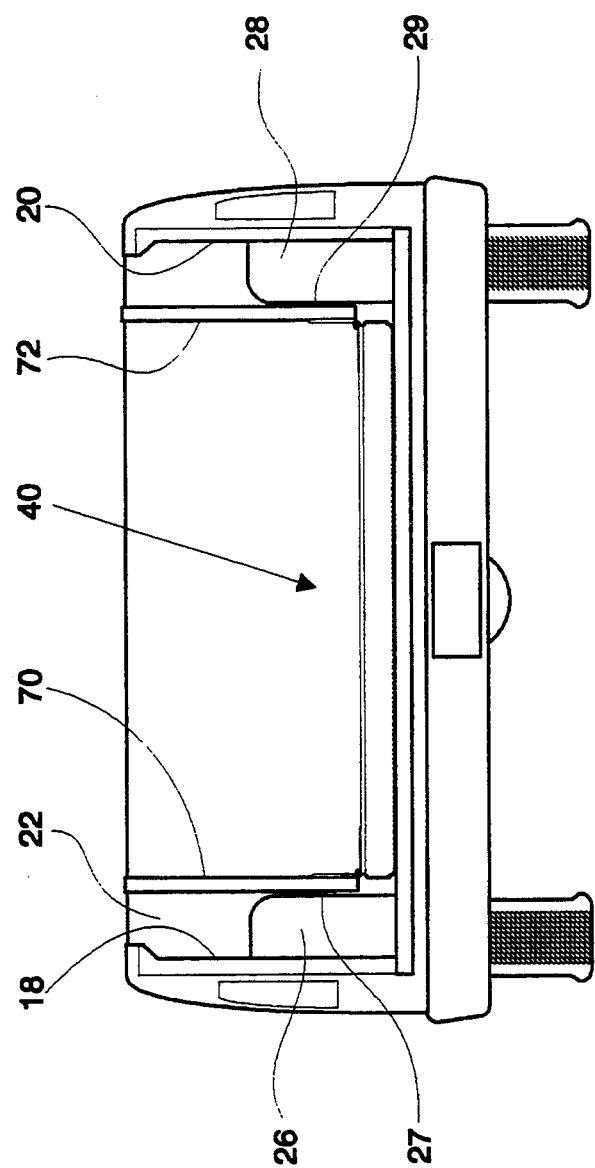
FIG. 2 shows a rear elevational view of the liner and pickup truck of FIG. 1.
Figure 3:
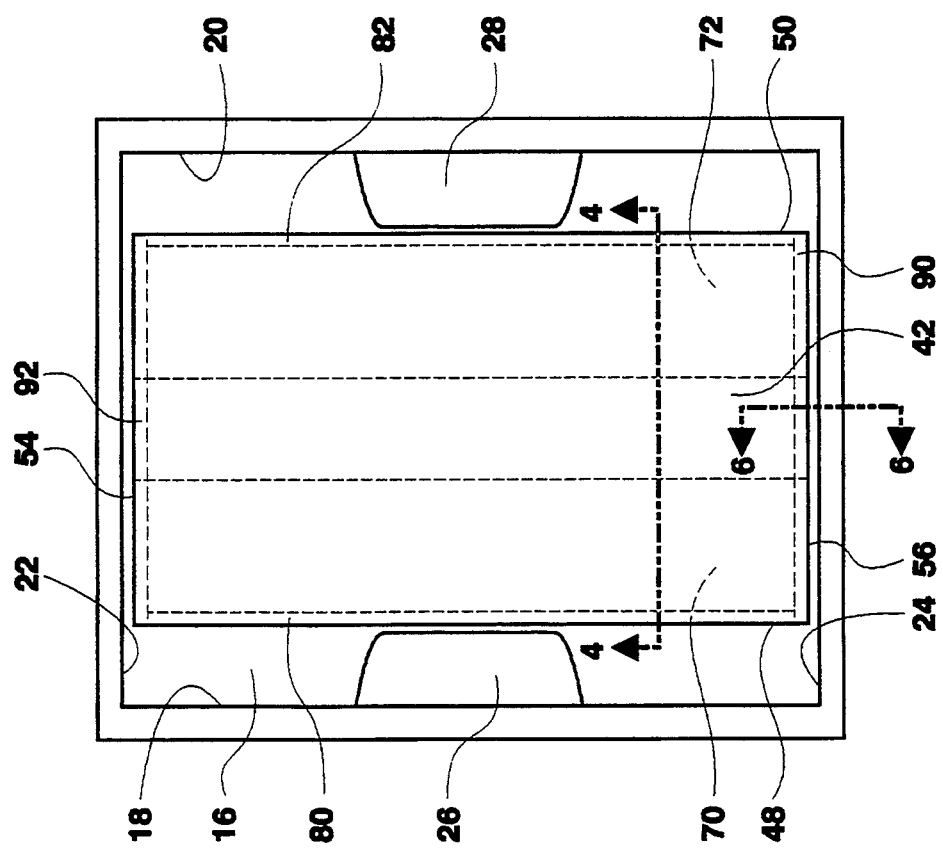
FIG. 3 shows a plan view of a liner of the present invention, positioned in a storage orientation, located within the pickup truck cargo bed of FIG. 1 when the tailgate of the truck is closed and the camper shell is not shown.

Again referencing FIGS. 1 and 2, installed in pickup truck cargo bed 14 is one embodiment of the invertible cargo bed liner of the present invention, generally designated 40. Invertible cargo bed liner 40 includes a rigid horizontal support structure or panel 42 which covers cargo bed floor 16. As best shown in FIG. 3, when in a preferred rectangular shape, liner 40 does not completely cover or overlay the regions of floor 16 immediately forward and rearward of wheel wells 26, 28.

Figure 4:
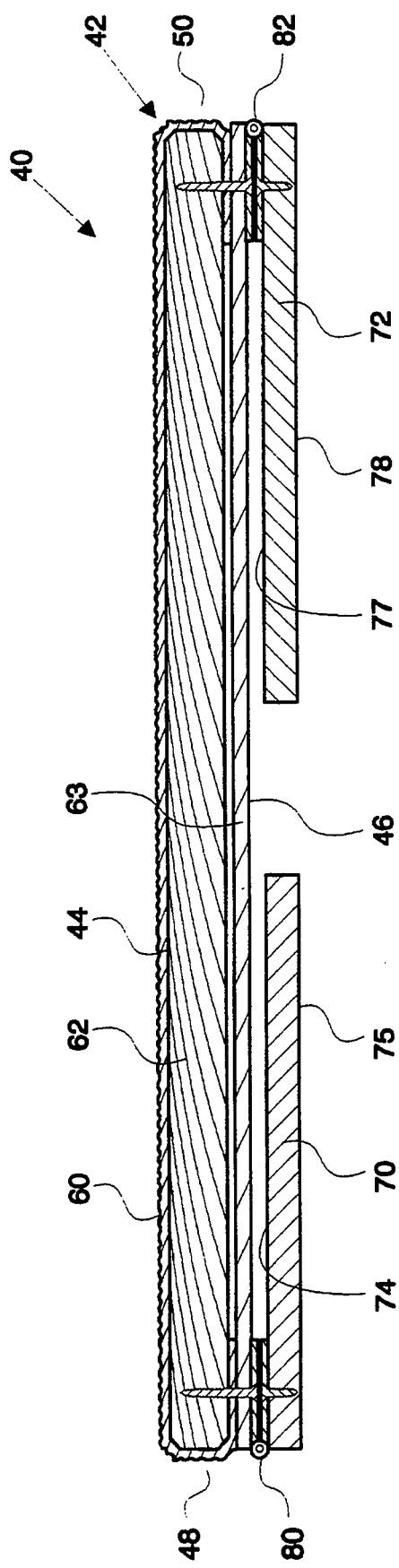
FIG. 4 shows an end view of the liner of FIG. 3, with the truck not shown, taken along line 4—4 in FIG. 3.

Support structure 42 includes top surface 44 and bottom surface 46. It will be appreciated that as the present invention pertains to an invertible cargo bed liner, directional terms such as top and bottom are normally dependent upon the orientation of liner 40 for meaning. For explanation purposes herein, liner 40 will be considered right-side-up when oriented in the storage orientation as shown in FIGS. 3 and 4 and upside down when in the materials transport orientation of FIGS. 1 and 2. Consequently, top surface 44 faces downwardly and bottom surface 46 faces upwardly in FIG. 1, and top surface 44 faces upwardly and bottom surface 46 faces downwardly in FIG. 4. Support structure 42 includes and is further bounded by first side edge 48 and opposing second side edge 50, forward edge 54, and rearward edge 56. The distance between opposing side edges 48, 50 defines the width of support structure 42, and the distance between forward edge 54 and rearward edge 56 defines the length of support structure 42. In the rectangular liner embodiment illustrated, the length and width of support structure 42 are each constant and closely approximate, or are substantially equal to, the actual distances between forward upright wall 22 and tailgate 24, and inner side surface 27 of wheel well 26 and inner side surface 29 of wheel well 28 respectively. A three quarters of an inch s clearance is preferably provided between the edges of support structure 42 and these upright surfaces of cargo bed 14, which facilitates the fitting and insertion of liner 40 into cargo bed 14. In vehicles which lack wheel wells that project inwardly from the upright inner surfaces of the side walls, the width of support structure 42 will preferably be substantially equal to the distance between the side wall upright surfaces.

Figure 5:
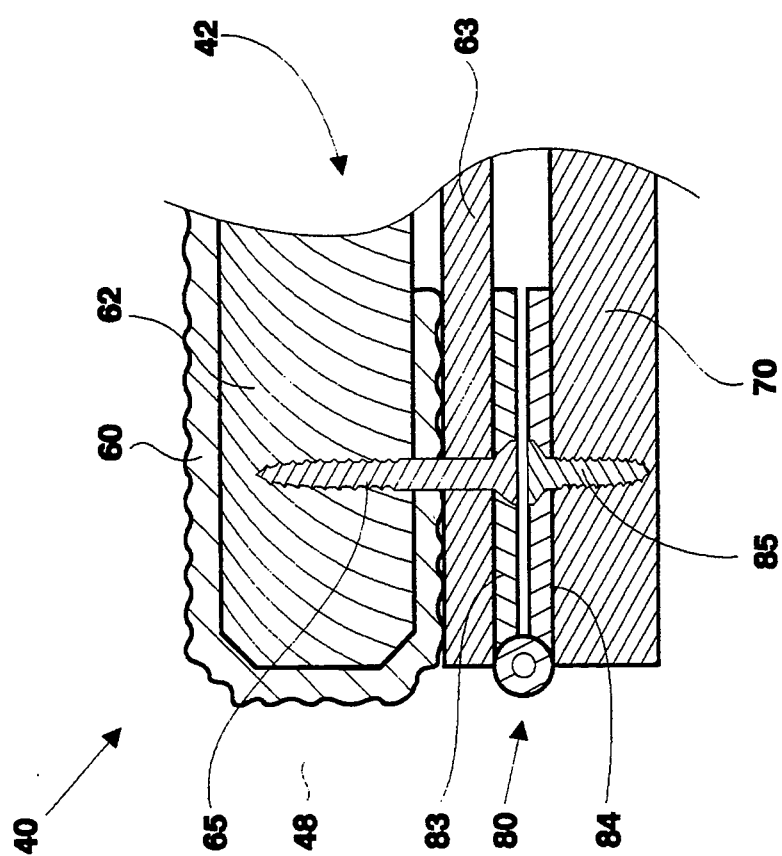
FIG. 5 shows an enlarged view of the construction of the liner support structure and the attachment with the protector panel of the embodiment of the present invention shown in FIGS. 1–4.

As best shown in FIG. 5, support structure 42, in the embodiment of the invention illustrated in FIGS. 1-4, is formed from the connection of rigid top panel 62 with bottom panel 63. Rigid top panel 62, the upper surface of which forms top surface 44 of support structure 42, is constructed from a one-half inch thick piece of plywood cut in a rectangular shape to custom fit within cargo bed 14. The lower surface of bottom panel 63 forms bottom surface 46 of support structure 42. Bottom panel 63 is constructed from a one-eighth inch sheet of plastic material, and is shaped similar to top panel 62. One material found appropriate for use as bottom panel 63 is a POLYLAST TM material, such as HD Black Polylast, available from Poly Tech Industries of Monticello, Ga. Rigid top panel 62 and bottom panel 63 are connected together by means of fasteners or screws 65, which prevent relative motion between the panels. Screws 65 are spaced around the entire perimeter of support structure 42, as screws 65 are employed to mount both piano hinges 80,82 and molding elements 90, 92 to support structure 42.

In order to provide liner 40 with a softer surface over which an operator can move, top surface 44 of support structure 42 is covered with padding means 60. Padding means 60 preferably comprises an industrial grade short pile foam back carpet. However, other relatively soft materials can be substituted for carpet 60, including unbacked carpets or various soft yet durable rubber compositions. Carpet 60 and top panel 62 are glued together to ensure a secure and non-sliding attachment. Carpet 60 preferably covers top surface 44 in its entirety and wraps around and covers at least a portion of first side edge 48, second side edge 50, forward edge 54, and rearward edge 56. The presence of carpet 60 along the edges of support structure 42 provides a buffer between the four cargo bed upright surfaces, for example walls 22, 24 and surfaces 27, 29 for pickup truck 10, and liner 40. This buffer hinders surface marring of cargo bed 14. In the embodiment illustrated in FIGS. 1-6, because its ends are pressed and secured between top panel 62 and bottom panel 63, carpet 60 covers a substantial portion of edges 48, 50, 54, 56 of support structure 42. More specifically, carpet 60 covers the top panel portion of the edges of support structure 42. Carpet 60 is further attached to support structure 42 by screws 65, as well as by the friction forces resulting from the clamping of the carpet ends between panels 62, 63. Of course, the bottom panel portion of the four edges of support structure 42 could also be covered by carpet 60. Moreover, those of skill in the art will recognize that the carpet edges, and s therefore the carpet, could be directly attached to the edges of support structure 42, for example by staples. Such design modifications as well as obvious modifications are considered to be within the scope of the invention.

Figure 6:
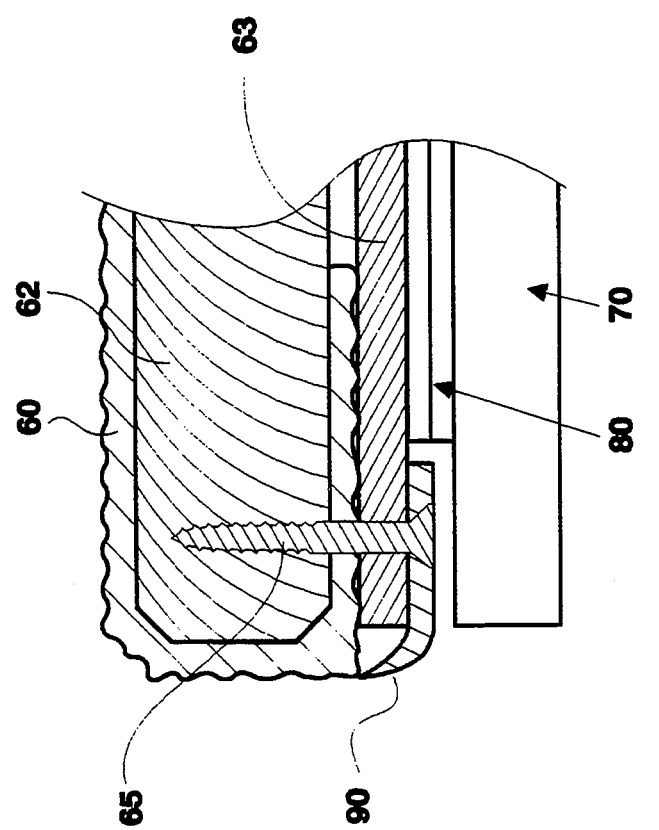
FIG. 6 shown an enlarged view, taken along line 6—6 in FIG. 3, of the rearward edge of the liner with the truck not shown.

With reference to FIG. 6, located along rearward edge 56 of support structure 42 is molding member or strip 90, which can be a metal floor tile edge molding. An identical molding member 92 is similarly located along forward edge 54, and explanation of molding member 90 applies equally to molding member 92. Molding member 90 is positioned on bottom surface 46 and extends the entire width of support structure 42. Molding member 90 extends over and partially covers rearward edge 56. Screws 65 spaced along the extent of molding member 90 further secure bottom panel 63 to top panel 62 of support structure 42. Molding member 90 distributes pressure along the support structure width to better secure carpet 60, as well as hampers dirt and other particles from slipping in between panels 62 and 63.

Pivotally connected to support structure 42 are a pair of pivotable rigid protector panels 70, 72 which are constructed from a one quarter inch sheet of plastic, preferably of the same type of material as used for bottom panel 63. This construction provides protector panels 70, 72 with sufficient rigidity such that the panels will not collapse under their own weight when positioned upright. Protector panel 70 includes top inward surface 74 and bottom outward surface 75. Protector panel 72 similarly includes top inward surface 77 and bottom outward surface 78. The top bottom distinction between these protector panel surfaces is a function of the orientation of panels 70, 72 when liner 40 is in the storage orientation shown in FIG. 4, and the inward-outward distinction is a function of the orientation of panels 70, 72 when liner 40 is in the materials transport orientation shown in FIG. 2. Each rigid protector panel 70, 72 has a length equal to the length of side edges 48, 50 of support structure 42. The height of each protector panel 70, 72 is preferable no more than half the width of support structure 42, as greater heights would result in panels 70, 72 overlapping when liner 40 is placed in a storage orientation. This overlap would improperly prevent liner 40 from resting flat on floor 16 of cargo bed 14. For pickup trucks, a desirable height for protector panels 70, 72 would be approximately equal to the height of side walls 18, 20, thereby protecting these walls from damage by materials being transported within liner 40.

The pivotal connection between panels 70, 72 and support structure 42 are provided by piano hinges 80, 82 respectively. Piano hinge 80 is disposed proximate side edge 48, or more particularly described as adjacent to side edge 48 in the illustrated embodiment, and extends nearly the entire length of support structure 42. Piano hinge 82 is similarly disposed with respect to side edge 50 and also extends along nearly the entire length of support structure 42. In the illustrated embodiment, hinges 80, 82 do not abut forward edge 54 and rearward edge 56 but rather end near molding strips 90, 92. As hinges 80 and 82 are structurally identical, the following explanation with respect to hinge 80 has equal application to hinge 82. Hinge member 83 (see FIG. 5) is secured to the bottom surface of support structure 42 by screws 65 spaced at intervals along the length of hinge 80. Hinge member 84 is secured by screws 85 to the top inward surface 74 of protector panel 70 at a location along the side edge of panel 70. As with screws 65, screws 85 are spaced intermittently along the length of hinge 80. It will be appreciated that hinges 80 and 82 respectively allow protector panels 70 and 72 to pivot relative to support structure 42. The range of orientations thereby provided for protector panels 70, 72 includes a horizontal position or orientation for storage, as well as an upright position or orientation for materials transport. When liner 40 is positioned in this storage orientation, top inward surfaces 74, 77 face bottom surface 46 of support structure 42. When liner 40 is positioned in this materials transport orientation, and when installed in cargo bed 14, bottom outward surfaces 75, 78 respectively face inner side surface 27 of wheel well 26 and inner side surface 29 of wheel well 28. Protector panels 70, 72 rest or lean against these surfaces for upright support. In vehicles without inwardly projecting wheel wells, the bottom outward surfaces 75, 78 will face and be supported by the opposing upright surfaces of the vehicle bed.

Figure 7:
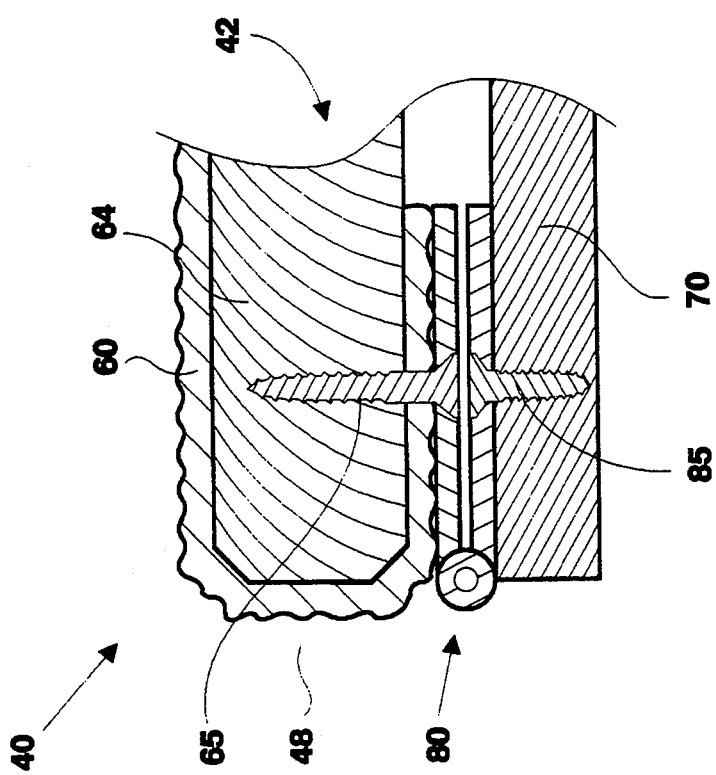
FIG. 7 shows an enlarged view of the construction of another embodiment of the liner support structure of the present invention and the s attachment with the protector panel.

Alternate embodiments of the present invention are illustrated in FIGS. 7 and 8, wherein parts corresponding to parts in the embodiments illustrated in FIGS. 1–6 are correspondingly numbered. Referring to FIG. 7, it will be appreciated that support structure 42 does not comprise a construction of two separate panels mechanically fastened together. The combination of rigid top panel 62, constructed of plywood, and the plastic bottom panel 63 fastened thereto with screws of the embodiment illustrated in FIGS. 1–6 has been replaced with a single thicker plastic panel 64. The selection of the material and size of panel 64 is guided by the need to provide sufficient rigidity such that liner 40 can still be used as a ramp. Using a plastic material to fabricate panel 64 is beneficial, as bottom surface 46 may contact soiled materials during operation and those properties of plastic which allow easy cleaning are desirable. An alternate one-piece support structure construction incorporates a plywood or wood panel prelaminated by the manufacturer with a thin plastic covering on one surface. The product which forms this alternate one-piece support structure can be obtained from Greenwood Forest Products of Lake Oswego, Oreg. This product provides support structure 42 with the necessary rigidity while still furnishing the easy cleaning plastic construction on the liner bottom surface.

Referring to FIG. 8, it will be appreciated that piano hinge 80 which pivotally connects protector panel 70 with bottom panel 63 of support structure 42 in the first embodiment has been removed. Instead, protector panel 70 and bottom panel 63 (as well as protector panel 72 and bottom panel 63 although not shown) are integral. In this embodiment, the pivotal connection means is an articulated intersection or web 86 between protector panel 70 and bottom panel 63. Web 86 preferably extends the entire length of panel 70. Web 86 provides the necessary flexibility to allow protector panels 70, 72 to pivot relative to support structure 42. It will be appreciated that this construction dispenses with the need for screws 85.

As is evident from the foregoing disclosure, the present invention provides an invertible cargo bed liner 40 which converts from a storage orientation to a materials transport orientation by inverting and unfolding the liner. For instance, during periods of normal vehicle operation when potentially dirty materials are not being transported, liner 40 in cargo bed 14 remains in a storage orientation as shown in FIG. 4. Upon encountering a need to transport cargo, the inversion of liner 40 takes place. Liner 40 is first pulled from cargo bed 14 and inverted such that protector panels 70, 72 are no longer disposed below support structure 42 but rather are disposed above it. Because of the symmetry of liner 40 in the embodiments illustrated, an operator can invert liner 40 in any manner desired without compromising the liner function or fit. For instance, it does not matter whether during inversion an operator rotates liner 40 and maintains rearward edge 56 adjacent tailgate 24, or flips liner 40 and causes the edge previously rearward during liner storage to be forward and adjacent forward upright wall 22. Then, after inversion, protective panels 70 and 72 can be pivoted or unfolded to an upright orientation to protect side walls 18, 20 as well as wheel wells 26, 28 from damage by materials loaded onto liner 40. It will also be appreciated that because the piano hinges 80, 82 or webs 86 used to connect panels 70, 72 to support structure 42 are continuous along the liner side edges, dirt or soil from the materials being transported will not escape from liner 40 along its side edges to contaminate cargo bed 14. Liner 40 also transforms from a relatively flat storage orientation to a materials transport orientation to protectively cover the cargo bed floor and sides. Due to padding or carpet 60, invertible cargo bed liner provides a padded covering of cargo bed floor 16 when liner 40 is disposed in a storage orientation, thereby allowing a person to travel across cargo bed floor 16 without discomfort. Liner 40 also provides a floor covering member or support structure 42 sufficiently rigid and strong to allow liner 40 to be used as a ramp, thereby facilitating loading and unloading of the vehicle in which liner 40 is mounted. The ability to easily extract liner 40 from cargo bed 14, as well as the construction of the bottom surface, makes simple the cleaning of liner 40. For instance, liner 40 can be ramped down after transport of materials and then brushed or wiped off. Because carpet 60 can be arranged to at least partially cover the edges of support structure 42 of liner 40, the likelihood of damage to the cargo bed interior resulting from rubbing and sliding collisions with liner 40 is reduced. Furthermore, carpet 60 of liner 40 can be custom selected to match the decor of the vehicle in which it is installed so as to provide an attractive or complementary appearance when positioned in a storage orientation.

What is claimed is:

1. An invertible cargo bed liner for use with a vehicle cargo bed comprising a floor and a pair of opposing upright side surfaces, the liner comprising:

a rigid horizontal support structure for covering the vehicle cargo bed floor, said support structure having a top surface, a bottom surface, opposing first and second side edges, a forward edge, a rearward edge, and a width as defined by a distance between the opposing side edges, the support structure further comprising a rigid top panel connected to a bottom panel, said top panel forming the top surface of said support structure, said bottom panel forming the bottom surface of said support structure;

padding means attached to said support structure and covering the top surface of said support structure;

first and second pivotable rigid protector panels, each protector panel having a top inward surface and a bottom outward surface, each rigid protector panel having a length equal to the length of the side edges of said supports structure and a height no more than half the width of said support structure; and means for pivotally connecting the first protector panel to said support structure proximate the first side edge and the second protector panel to said support structure proximate the second side edge, said pivotally connecting means allowing each of said protector panels to be oriented at a horizontal position for storage with the top inward surface facing the bottom surface of said support structure, and an upright position for materials transport with the bottom outward surface facing one of the vehicle bed uprights sides, each pivotally connecting means comprising a piano hinge.

2. The invertible cargo bed liner of claim 1 wherein the top panel further comprises plywood, and tile bottom panel and said protector panels further comprise plastic.

3. The invertible cargo bed liner of claim 2 wherein said padding means further comprises a foam backed carpet.

4. The invertible cargo bed liner of claim 3 further comprising a molding member positioned on the bottom surface and partially covering the support structure rearward edge.

5. An invertible cargo bed liner for use with a pickup truck cargo bed comprising a floor, a forward upright wall, a rearward upright wall, and opposing upright side walls each having inwardly extending wheel wells with inner side surfaces generally perpendicular to the floor, the liner comprising:

a rigid horizontal support structure for covering the cargo bed floor, said support structuring having a top surface, a bottom surface, first and second opposing side edges, a forward edge, a rearward edge, a length substantially equal to the distance between the forward upright wall and the rearward upright wall, and a width substantially equal to the distance between the inner side surfaces of the wheel wells, the support structure further comprising a rigid top panel, comprised of plywood, connected to a bottom panel, comprised of plastic, said top panel forming the top surface of said support structure, said bottom panel forming the bottom surface of said support structure, padding means attached to said support structure, said padding means covering the top surface and at least a portion of the opposing side edges of said support structure;

first and second pivotable rigid protector panels, each protector panel having a top inward surface and a bottom outward surface, said protector panels each having a length substantially equal to the length of said support structure and a height no more than half the width of said support structure: and means for pivotally connecting the first protector panel to said support structure proximate the first opposing side edge and the second protector panel to said support structure proximate the second opposing side edge, said pivotally connecting means allowing each of said protector panels to be oriented at a horizontal position for storage with the top inward surface facing the bottom surface of said support structure, and an upright position for materials transport with the bottom outward surface facing one of the inner side surfaces of the inwardly extending wheel well, each pivotally connecting means comprising a piano hinge.

6. The invertible cargo bed liner of claim 5 wherein said padding means further comprises a foam backed carpet.

7. An invertible cargo bed liner for use with a vehicle cargo bed comprising a floor and a pair of opposing upright side surfaces, the liner comprising:

a rigid horizontal support structure for covering the vehicle cargo bed floor, said support structure having a top surface, a bottom surface, opposing first and second side edges, a forward edge, a rearward edge, and a width as defined by a distance between the opposing side edges, said support structure comprising a rigid top panel connected to a bottom panel, said top panel forming the top surface of said support structure, said bottom panel forming the bottom surface of said support structure;

padding means attached to said support structure and covering the top surface of said support structure;

first and second pivotable rigid protector panels, each protector panel having a top inward surface and a bottom outward surface, each protector panel having a length equal to the length of the side edges of said support structure and a height no more than half the width of said support structure; and means for pivotally connecting the first protector panel to said support structure proximate the first side edge and the second protector panel to said support structure proximate the second side edge, said pivotally connecting means allowing each of said protector panels to be oriented at a horizontal position for storage with the top inward surface facing the bottom surface of said support structure, and an upright position for materials transport with the bottom outward surface facing one of the vehicle bed upright side surfaces.

8. The invertible cargo bed liner of claim 7, wherein the top panel further comprises plywood, and the bottom panel and said protector panels further comprise plastic.

9. The invertible cargo bed liner of claim 8 wherein said padding means further comprises a foam backed carpet.

10. The invertible cargo bed liner of claim 8, further comprising a molding member positioned on the bottom surface and partially covering the support structure rearward edge.

11. The invertible cargo bed liner of claim 8, wherein the padding means further covers at least a portion of the opposing side edges of said support structure.

12. The invertible cargo bed liner of claim 7, wherein each pivotally connecting means further comprises a piano hinge.

* * * * *